(12) United States Patent
Rekimoto

(10) Patent No.: US 6,470,341 B1
(45) Date of Patent: *Oct. 22, 2002

(54) DATA TRANSFERRING AND/OR RECEIVING APPARATUS, METHOD, AND PROGRAM STORAGE MEDIUM

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/123,721

(22) Filed: Jul. 28, 1998

(30) Foreign Application Priority Data

Jul. 30, 1997 (JP) .............................................. 9-204858

(51) Int. Cl.[7] .............................. G06F 17/30; G06F 3/00
(52) U.S. Cl. .......................................... 707/10; 345/764
(58) Field of Search ................................ 345/179, 163, 345/169, 173, 326–354, 764; 707/1, 8, 10; 709/227, 218, 219; 710/68, 62, 260–269, 303, 308

(56) References Cited

U.S. PATENT DOCUMENTS 6,108,727 A * 8/2000 Boals et al. .................. 710/68
6,209,034 B1 * 3/2001 Gladwin et al. ............. 709/227

* cited by examiner

Primary Examiner—Safet Metjahic
Assistant Examiner—Susan Chen
(74) Attorney, Agent, or Firm—Bell, Boyd & Lloyd LLC

(57) ABSTRACT

A data transferring and/or method, and program storage medium which use a user interface that effects natural and simple data transmission among a number of computers. In the data transmitting system, a number of computers in which an input operation is performed on a display by using a pen-type input device are connected on a network. Upon performing an input operation by the pen-type input device, each computer checks a management table provided on the network and determines whether management information is registered. If it is found that the management information is not registered, the name of the file and the shape of the icon, which are indicated by the icon selected by the pen-type input device, are registered as the management information. If it is found that the management information is registered, it is obtained. When the pen-type input device touches the display, a request is provided to the computer indicated by the management information to transmit data, and the icon is displayed on the display unit.

54 Claims, 11 Drawing Sheets

DATA TRANSFERRING AND/OR RECEIVING APPARATUS, METHOD, AND PROGRAM STORAGE MEDIUM

BACKGROUND OF THE INVENTION

The present invention relates to a data transferring and/or receiving apparatus, method, and program storage medium, all in which data is transferred either within a single computer or among a number of computers.

Up until now, for transferring information displayed on a screen within a single computer, a user interface technique, which is referred to as "drag and drop", has been used. In the drag and drop technique, a subject that is being displayed on a computer screen, for example an icon, which represents information concerning a file stored in, for example, a hard disk, is clicked and dragged to a desired folder with a mouse and then dropped there. According to the drag and drop technique, the user is able to handle a subject displaced on a computer screen as if he/she were moving a real object, thereby enabling the user to naturally operate the computer.

However, if it is desired that a subject displayed on a screen is to be transferred to a different screen, i.e., when data, such as a file, is to be transferred between different computers, a natural user interface technique, such as the drag and drop technique, is not conventionally provided. For example, if a subject is to be transferred between different screens, the user is required to execute a command, such as a remote file copy command or an information transfer command.

In this manner, conventionally, even though a file transfer operation is performed between different computers, an op ration is disadvantageously conducted on the screen of a single computer. This type of user interface technique is far from representing the concept that a real object is being moved. Thus, the user is unable to perform a natural and simple operation in order to transfer a file between different computers.

SUMMARY OF THE INVENTION

Accordingly, in view of the above background, it is an object of the present invention to provide a data transferring and/or receiving apparatus, method, and program storage medium, all of which use a user interface that enables natural and simple data transfer in a single computer or natural and simple data transmission among a number of computers.

In order to achieve the above object, according to one embodiment of the present invention, there is provided a data transferring apparatus including a data storage unit for storing data. A display/input unit displays information concerning the presence of the data stored in the data storage unit and is operated by an input operation unit. A network connector transmits data via a network that is provided with a management table in which management information representing the information concerning the presence of the data is registered. A controller registers in the management table, upon selecting by the input operation unit the information concerning the presence of the data displayed on the display/input unit, the management information representing the information concerning the presence of the selected data. The controller also transfers, upon obtaining a data transmission request that has been provided by the input operation unit from a device on the network, data corresponding to the information indicating the presence of the data represented by the registered management information from the data storage unit to the device on the network.

In the aforementioned data transferring apparatus, there is provided a management table on the network in which the management information representing the information concerning the presence of the data selected by the operation input unit is registered. The management table on the network is shared with other apparatuses connected to the network. In the above-described data transferring apparatus, when the information concerning the presence of the data is selected by the input operation unit, the management information representing the information concerning the presence of the selected data is registered in the management table. When the apparatus of the present invention or another apparatus is selected by the input operation unit, the selected apparatus checks for the management information in the management table and requests the apparatus of the present invention to transmit data indicted by the management information in the management table. Then, the data transferring apparatus of the present invention transmits the data corresponding to the management information to the apparatus that has requested data transmission.

In the aforementioned data transferring apparatus, the display/input unit may be operated by a single input operation unit or a number of input operation units, each having an ID number. The controller may identify, upon selecting by the input operation unit the information concerning the presence of the data displayed on the display/input unit, the ID number of the operated input operation unit and may register the management information representing the information concerning the presence of the selected data in the management table in correspondence with the identified ID number.

In the aforementioned data transferring apparatus, the management table in which the management information representing the information concerning the presence of the data selected by the input operation unit is registered is provided on the network according to the ID number of the input operation unit. In this data transferring apparatus, when the information concerning the presence of the data is selected by the input operation unit, the management information representing the information concerning the presence of the selected data is registered in the management table in correspondence with the ID number of the input operation unit. When the apparatus of the present invention or another apparatus is selected by the input operation unit having the above ID number, the selected apparatus checks for the management information registered in they management table having the above ID number and requests the apparatus of the present invention to transmit data indicated by the management information registered in the management table having the above ID number.

According to another embodiment of the present invention, there is provided a data receiving apparatus including a data storage unit for storing data. A display/input unit displays information concerning the presence of the data stored in the data storage unit and is operated by an input operation unit. A network connector transmits data via a network that is provided with a management table in which management information representing the information concerning the presence of the data is registered. A controller requests, upon performing an input operation on the display/input unit by the input operation unit, a device on the network indicated by the management information registered in the management table to transmit data corresponding to the management information. The controller also receives the data from the device on the network and stores it in the data storage unit.

In the aforementioned data receiving apparatus, there is provided a management table on the network in which the management information representing the information concerning the presence of the data selected by the input operation unit is registered. The management table on the network is shared with other apparatuses connected to the network. In this data receiving apparatus, when the display/input unit is selected by the input operation unit, the management information registered in the management table is checked, and a request is provided to the apparatus of the present invention or another apparatus indicated by the management information registered in the management table to transmit data corresponding to the management information. The apparatus that has received the data transmission request transmits the data corresponding to the management information. The data receiving apparatus then receives the data and stores it.

According to the aforementioned data receiving apparatus, the display/input unit may be operated by a single input operation unit or a number of input operation units, each having an ID number. The controller may identify, upon performing an input operation on the display/input unit by the input operation unit, the ID number of the operated input operation unit, and may request the device on the network indicated by the management information registered in the management table in correspondence with the ID number, to transmit the data corresponding to the management information.

In the above-described data receiving apparatus, the management table in which the management information representing the information concerning the presence of the data selected by the input operation unit is registered is provided on the network according to the ID number of the input operation unit. When the display/input unit is selected by the input operation unit, the management information registered in the management table in correspondence with the ID number of the operated input operation unit is checked. Then, a request is provided to the apparatus of the present invention or another apparatus indicated by the management information registered in the management table having the above ID number to transmit data corresponding to the management information having the above ID number.

According to still another embodiment of the present invention, there is provided a data transferring and receiving apparatus including a data storage unit for storing data. A display/input unit displays information concerning the presence of the data stored in the data storage unit and is operated by an input operation unit. A network connector transmits data via a network that is provided with a management table in which management information representing the information concerning the presence of the data is registered. A controller checks for, upon performing an input operation on the display/input unit by the input operation unit, management information registered in the management table. If there is no management information registered in the checked management table and the information concerning the presence of the data displayed on the display/input unit is selected by the input operation unit, the controller registers the management information representing the information concerning the presence of the selected data in the management table. The controller further transfers from the data storage unit to the device on the network, upon obtaining a data transmission request that has been provided by the input operation unit from the device on the network, data corresponding to the information concerning the presence of the data represented by the registered management information. On the other hand, if management information representing the information concerning the presence of the data is registered in the checked management table, the controller requests the device on the network indicted by the management information to transmit data corresponding to the management information and receives the data from the device on the network and stores it in the data storage unit.

In the aforementioned data transferring and receiving apparatus, there is provided a management table on the network in which the management information representing the information concerning the presence of the data selected by the input operation unit is registered. The management table on the network is shared with other apparatuses connected to the network. When the information concerning the presence of the data is selected by the input operation unit, the management information representing the information concerning the selected data is registered in the management table. When the apparatus of the present invention or another apparatus is selected by the input operation unit, the selected apparatus checks for the management information registered in the management table and requests the apparatus of the present invention to transmit data indicated by the management information. The data transferring and receiving apparatus transmits the data corresponding to the management information to the apparatus that as requested data transmission. Further, in this data transferring and receiving apparatus, when the display/input unit is selected by the input operation unit, the management information registered in the management table is checked, and a request is provided to the apparatus of the present invention or another apparatus indicated by the management information registered in the management table to transmit data corresponding to the management information. The apparatus that has received the data transmission request transmits the data corresponding to the management information. Then, the data transferring and receiving apparatus receives the data and stores it.

In the aforementioned data transferring and receiving apparatus, the display/input unit may be operated by a single input operation unit or a number of input operation units, each having an ID number. The controller any identify, upon selecting the information concerning the presence of the data indicated on the display/input unit by the input operation unit, the ID number of the operated input operation unit and may check for management information registered in the management table in correspondence with the identified ID number. If there is no management information registered in the checked management table and the information concerning the presence of the data displayed on the display/input unit is selected by the input operation unit, the controller may register the management information representing the information concerning the presence of the selected data in the management table in correspondence with the identified ID number. In contrast, if management information representing the information concerning the presence of the data is registered in the checked management table, the controller may request the device on the network indicated by the management information registered in the management table in correspondence with the ID number to transmit data corresponding to the management information.

In the aforementioned data transferring and receiving apparatus, the management table in which the management information representing the information concerning the presence of the data selected by the input operation unit is registered is provided on the network according to the ID number of the input operation unit. When the information concerning the presence of the data is selected by the input operation unit, the management information representing the information concerning the presence of the selected data is registered in the management table in correspondence with the ID number of the input operation unit. When the apparatus of the present invention or another apparatus is selected by the input operation unit having the ID number, the selected apparatus checks for the management information registered in the management table having the above ID number and requests the apparatus of the present invention to transmit data indicated by the management information registered in the management table having the above ID number. Further, in this data transferring and receiving apparatus, when the display/input unit is selected by the input operation unit, the management information registered in the management table in correspondence with the ID number of the input operation unit is checked, and a request is provided to the apparatus of the present invention or another apparatus indicated by the management information registered in the management table having the above ID number to transmit data corresponding to the management information having the above ID number.

According to a further embodiment of the present invention, there is provided a data transmitting system including a network provided with a management table in which management information representing information concerning the presence of data is registered. A number of data transferring and receiving apparatuses are connected on the network. Each of the data transferring and receiving apparatuses has a data storage unit for storing data. A display/input unit displays information concerning the presence of the data stored in the data storage unit and is operated by an input operation unit. A network connector transmits data via the network. A controller checks for, upon performing an input operation on the display/input unit by the input operation unit, management information representing the information concerning the presence of the data registered in the management table. If there is no management information registered in the checked management table and the information concerning the presence of the data displayed on the display/input unit is selected by the input operation unit, the controller means registers the management information representing the information concerning the presence of the selected data in the management table and further transfers from the data storage unit to the device on the network, upon obtaining a data transmission request that has been provided by the input operation unit from the device on the network, data corresponding to the information concerning the presence of the data represented by the registered management information. Conversely, if management information representing the information concerning the presence of the data is registered in the checked management table, the controller requests the device on the network indicated by the management information to transmit data corresponding to the management information and receives the data from the device on the network and stores it in the data storage unit.

In the aforementioned data transmitting system, the management table provided on the network is shared with the data transferring and receiving apparatuses connected to the network. When the information concerning the presence of the data displayed on a single data transferring and receiving apparatus is selected by the input operation unit, the data transferring and receiving apparatus registers the management information representing the information concerning the presence of the selected data in the management table. Then, when the above data transferring and receiving apparatus or another data transferring and receiving apparatus is selected by the input operation unit, the selected apparatus checks for the management information registered in the management table and requests the above data transferring and receiving apparatus to transmit data indicated by the management information registered in the management table. In the data transmitting system, the above data transferring and receiving apparatus then transmits the data corresponding to the management information to the apparatus that has requested data transmission. The data transmitting system then receives the data and stores it.

In the above-described data transmitting system, the display/input unit of each of the data transferring and receiving apparatuses may be operated by a single input operation unit or a number of input operation units, each have in an ID number. The controller of each of the data transferring and receiving apparatuses may identify, upon selecting the information concerning the presence of the data indicated on the display/input unit by the input operation unit, the ID number of the operated input operation unit and may check for management information in the management table in correspondence with the identified ID number. If there is no management information registered in the checked management table and the information concerning the presence of the data displayed on the display/input unit is selected by the input operation unit, the controller may register the management information representing the information concerning the presence of the selected data in the management table corresponding to the identified ID number. On the other hand, if management information representing the information concerning the presence of the data is registered in the checked management table the controller may request the device on the network indicated by the management information registered in the management table in correspondence with the ID number to transmit data corresponding to the management information.

In this data transmitting system, when the information concerning the presence of the data displayed on a single data transferring and receiving apparatus is selected by the input operation unit, the data transferring and receiving apparatus registers the management information representing the information concerning the presence of the selected data in the management table corresponding to the ID number of the operated input operation unit. When the above data transferring and receiving apparatus or another data transferring and receiving apparatus is selected by the input operation unit, the selected apparatus checks for the management information registered in the management table having the ID number and requests the above data transferring and receiving apparatus to transmit data indicated by the management information registered in the management table having the ID number.

According to a yet further embodiment of the present invention, there is provided a data transferring method including the steps of registering, upon selecting information concerning the presence of displayed data by an input operation unit, management information representing the information concerning the presence of the selected data in a management table provided on a network, and transferring, upon obtaining a data transmission request that as been provided by the input operation unit from a device on the network, data corresponding to the information concerning the presence of the data represented by the registered management information to the device on the network.

In the aforementioned data transferring method, there is provided a management table on the network in which the management information representing the information concerning the presence of the data selected by the input operation unit is registered. The management table on the network is shared among apparatuses connected to the network.

In this data transferring method, the information concerning the presence of the displayed data may be operated by a single input operation unit or a number of input operation units, each having an ID number. If the information concerning the presence of the displayed data is selected by the input operation unit, the ID number of the operated input operation unit may be identified, and the management information representing the information concerning the presence of the selected data may be registered in the management table in correspondence with the identified ID number.

In this data transferring method, the management table in which the management information representing the information concerning the presence of the data selected by the input operation unit is registered is provided on the network according to the ID number of the input operation unit.

According to a further embodiment of the present invention, there is provided a data receiving method including the steps of identifying, upon performing an input operation by an input operation unit, management information registered in a management table provided on a network and requesting a device on the network indicated by the management information to transmit data corresponding to the management information, and receiving the data from the device on the network and storing it.

In this data receiving method, there is provided a management table on the network in which the management information representing the information concerning the presence of the data selected by the input operation unit is registered. The management table on the network is shared among the apparatuses connected to the network.

In the data receiving method, an input operation may be performed by a ingle input operation unit or a number of input operation units, each having an ID number. Upon performing an input operation by the input operation unit, the ID number of the operated input operation unit may be identified, and the management information registered in the management table in correspondence with the identified ID number may be checked, and a request may be provided to the device on the network indicated by the management information to transmit the data corresponding to the management information.

In this data receiving method, the management table in which the management information representing the information concerning the presence of the data selected by the input operation unit is registered is provided on the network according to the ID number of the input operation unit.

According to a further embodiment of the present invention, there is provided a data transferring and receiving method including the steps of checking for, upon performing an input operation by an input operation unit, management information representing information concerning the presence of data registered in a management table provided on a network, registering in the management table, in a case where there is no management information registered in the checked management table and where the information concerning the presence of the displayed data is selected by the input operation unit, the management information representing the information concerning the presence of the selected data, and transferring, upon obtaining a data transmission request that has been provided by the input operation unit from a device on the network, data corresponding to the information concerning the presence of the data indicated by the registered management information to the device on the network, and requesting, in a case where the management information representing the information concerning the presence of the data is registered in the checked management table, the device on the network indicated by the management information to transmit data corresponding to the management information, and receiving the data from the device on the network and storing it.

In the aforementioned data transferring and receiving method, there is provided a management table on the network in which the management information representing the information concerning the presence of the data selected by the input operation unit is registered. The management table on the network is shared among the apparatuses connected to the network.

In the data transferring and receiving method, an input operation may be performed by a single input operation unit or a number of input operation units, each having an ID number. Upon selecting the information concerning the presence of the displayed data by the input operation unit, the ID number of the operated input operation unit may be identified, and the management information registered in the management table in correspondence with the identified ID number may be checked. If there is no management information registered in the checked management table and if the information concerning the presence of the displayed data is selected by the input operation unit, the management information representing the information concerning the presence of the selected data may be registered in the management table in correspondence with the identified ID number. In contrast, if the management information representing the information concerning the presence of the data is registered in the checked management table, a request may be provided to the device on the network indicated by the management information registered in the management table in correspondence with the identified ID number to transmit data corresponding to the management information.

In this data transferring and receiving method, the management table in which the management information representing the information concerning the presence of the data selected by the input operation unit is registered is provided on the network according to the ID number.

According to a further embodiment of the present invention, there is provided a data transmitting method including the steps of registering, upon selecting information concerning the presence of data displayed on a transmitting side by an input operation unit, management information representing the information concerning the presence of the selected data in a management table provided on a network, checking, upon performing an input operation on a receiving side by the input operation unit, the management information and requesting the transmitting side to transmit data corresponding to the management information, transferring to the receiving side from the transmitting side, upon obtaining the data transmission request, the data corresponding to the information concerning the presence of the data to indicated by the registered management information, and receiving the data by the receiving side and storing it.

In the data transmitting method, there is provided a management table on the network in which the management information representing the information concerning the presence of the data selected by the input operation unit is registered. The management table on the network is shared between the transmitting side and the receiving side connected to the network.

In the aforementioned data transmitting method, an input operation may be performed by a single input operation unit or a number of input operation units, each having an ID number. Upon selecting the information concerning the presence of the data displayed on the transmitting side by the input operation unit, the transmitting side may identify the ID number of the operated input operation unit and may register the management information representing the information concerning the presence of the selected data in the management table in correspondence with the identified ID number. Upon performing an input operation on the receiving side by the input operation unit, the receiving side by the input ID number of the operated input operation unit and may check the management information registered in the management table in correspondence with the identified ID number. The receiving side may provide a request to the transmitting side to transmit data corresponding to the management information.

In this data transmitting method, the management table in which the management information representing the information concerning the presence of the data selected by the input operation unit is registered is provided on the network according to the ID number of the input operation unit.

According to a further embodiment of the present invention, there is provided a data transferring program storage medium storing a program that executes processing including the steps of registering, upon selecting information concerning the presence of displayed data by an input operation unit, management information representing the information concerning the presence of the selected data in a management table provided on a network, and transferring, upon obtaining a data transmission request that has been provided by the input operation unit from a device on the network, data corresponding to the information concerning the presence of the data indicated by the registered management information to the device on the network.

In the aforementioned data transferring program storage a medium, the program may execute the following processing. If the information concerning the presence of the displayed data is operated by a single input operation unit or a number of input operation units, each having an ID number, and is selected by the input operation unit, the ID number of the operated input operation unit may be identified, and the management information representing the information concerning the presence of the selected data may be registered in the management table in correspondence with the identified ID number.

According to a further embodiment of the present invention, there is provided a data receiving program storage medium storing a program that executes processing including the steps of requesting, upon performing an input operation by an input operation unit, a device on a network indicated by management information representing information concerning the presence of data registered in a management table provided on a network to transmit data corresponding to the management information, and receiving the data from the device on the network and storing it.

In the aforementioned data receiving program storage medium, the program may execute the following processing. Upon performing an input operation by a single input operation unit or a number of input operation units, each having an ID number, the ID number of the operated input operation unit may be identified, and a request may be provided to the device on the network indicated by the management information registered in the management table in correspondence with the identified ID number to transmit data corresponding to the management information.

According to another embodiment of the present invention, there is provided a data transferring and receiving program storage a medium storing a program that executes processing including the steps of checking for, upon performing an input operation by an input operation unit, management information representing information concerning the presence of data registered in a management table provided on a network, registering, in a case where there is no management information in the checked management table and where the information concerning the presence of the displayed data is selected by the input operation unit, the management information representing the information concerning the presence of the selected data in the management table, and transferring, upon obtaining a data transmission request that has been provided by the input operation unit from a device on the network, data corresponding to the information concerning the presence of the data indicated by the registered management information to the device on the network, and requesting, in a case where the management information representing the information concerning the presence of the data is registered in the checked management table the device on the network indicated by the management information to transmit data corresponding to the management information, and receiving the data from the device on the network and storing it.

In the aforementioned data transferring and receiving program storage medium, the program may execute the following processing. An input operation may be performed by a single input operation unit or a number of input operation units, each having an ID number. Upon selecting the information concerning the presence of the displayed data by the input operation unit, the ID number of the operated input operation unit may be identified, and the management information registered in the management table in correspondence with the identified ID number may be checked. If there is no management information registered in the checked management table and if the information concerning the presence of the displayed data is selected by the input operation unit, the management information representing the information concerning the presence of the selected data may be registered in the management table in correspondence with the identified ID number. Conversely, if the management information representing the information concerning the presence of the data is registered in the checked management table, a request may be provided to the device on the network indicated by the management information registered in the management table in correspondence with the ID number to transmit data corresponding to the management information.

Additional features and advantages of the present invention are described in, and will be apparent from, the following Detailed Description of the Invention and the Figures.

DETAILED DESCRIPTION OF THE INVENTION

Figure 1:
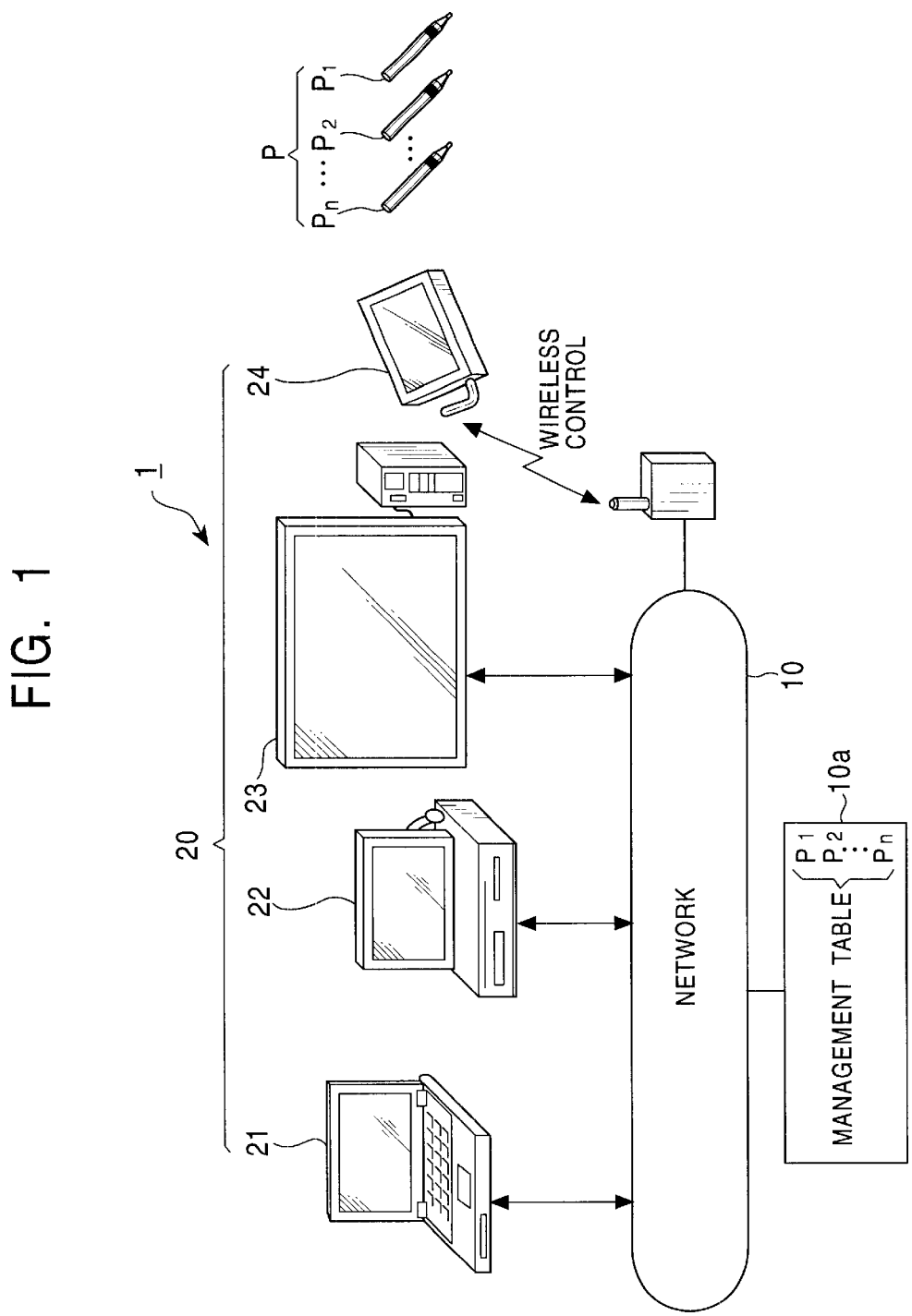
FIG. 1 illustrates a data transmitting system according to an embodiment of the present invention.

Referring to FIG. 1, a data transmitting system generally indicated by 1 according to an embodiment of the present invention is connected to a number of computers on a network 10 (which are hereinafter referred to as "the respective computers or each computer 20"). Each computer 20 has a display that displays output data (the display of each computer 20 is hereinafter generically referred to as "display D").

The display D of each computer 20 not only displays output data, but also directly inputs data with, for example, a pen-type input device P; i.e., the display D is of an input/output integral type. Namely, the display D integrally has a display function implemented by a liquid crystal and an input function, which is referred to as a tablet or a digitizer. The pen-type input device P is a pointing device in the shape of a pen and serves as a device for a input interface of each computer 20.

The user performs an input operation on the display D by using the pen-type input device P instead of a mouse or a trackball. The user is thus able to perform operations, such as clicking icons, conducting a drag and drop operation on icons, and handwriting characters or graphics.

The computers 20 having the above-described display D include, as illustrated in FIG. 1, a compact computer 21, which is referred to as a laptop or notebook-type computer, a general-purpose computer 22, which is referred to as a desktop-type computer, a presentation computer 23 provided with large display for presentation, and a compact mobile terminal 24, such as an individual information device or a diary-type computer, which is referred to as Personal Digital Assistant (PDA). It should be noted that the present invention is not limited to the aforementioned computers 20, but may be applicable to any computer.

The computers 20 are connected to the network 10, as noted above. Namely, data transfer can be made among the computers 20 via the network 10. The network 10 may be connected to the computers 20 via cable, or may be connected by wireless control, for example, to the compact mobile terminal 24 shown in FIG. 1.

The user performs an input operation on the respective computers 20 by using a number of pen-type input devices P (P1–Pn). The pen-type input devices P (P1–Pn) are in common use for the displays D of the individual computers 20. The pen-type input devices P (P1–Pn) are respectively provided with different ID numbers. When an input operation is performed on the display D of each computer 20 by using the p n-type input device P, the ID number of the used device P is identified by the computer 20.

The individual computers 20 share a management table 10a provided on the network 10. The management table 10a is provided corresponding to the ID numbers of the pen-type input devices P. Any computer 20 is able to read and write the management table 10a via the network 10. For example, a computer connected to the network 10 may be used as a host computer, and the management table 10a may be managed by this host computer. Alternatively, the individual computers 20 may have a common file and manage the management table 10a through this file.

Figure 2:
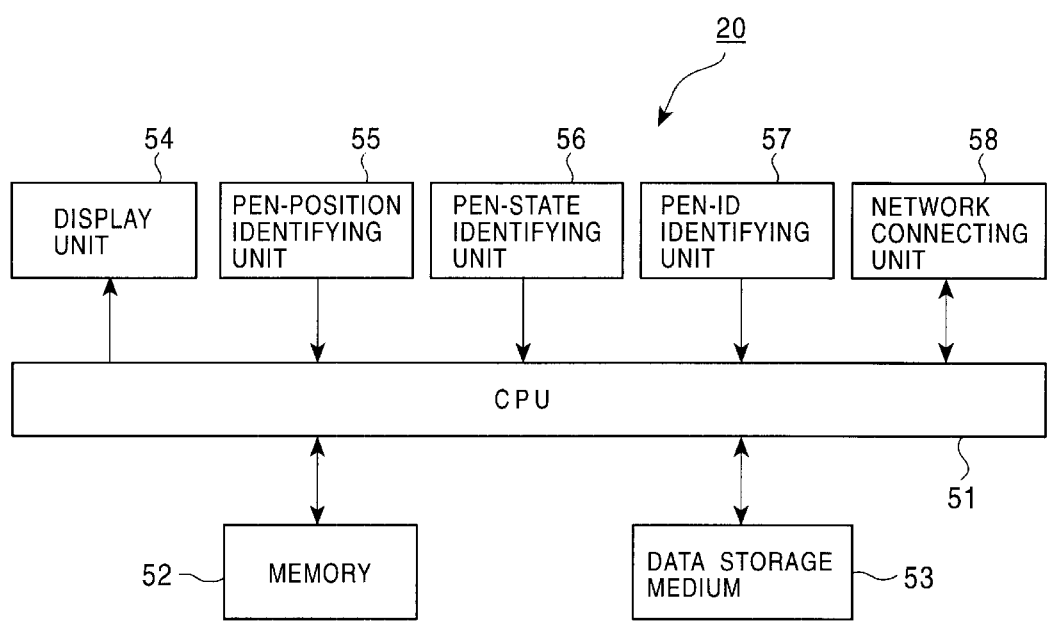
FIG. 2 is a block diagram illustrating the configuration of each computer for use in the data transmitting system shown in FIG. 1.

Each computer 20 has, as illustrated in FIG. 2, a central processing unit (CPU) 51, a memory 52, which serves as a data processing area or a data storage area, a data storage a medium 53 for storing, for example, a processing program or processing data, a display unit 54 for causing the display D to indicate images, a pen-position identifying unit 55 for identifying an input position of the pen-type input device P, a pen-state identifying unit 56 for identifying an input state of the pen-type input device P, a pen-ID identifying unit 57 for identifying an ID number of the pen-type input device P, and a network connecting unit 58 for transmitting data to another computer via the network 10.

The display unit 54 causes icons and data, such as text data and image data, to be displayed at predetermined positions of the display D.

The pen-position identifying unit 55 identifies the position of the operated pen-type input device P on the display D. The CPU 51 determines which data on the display D has been selected by the user's input operation according to the position of the pen-type input device P identified by the pen-position identifying unit 55 and the position of the display data which has been displayed by the instruction of the display unit 54. For example, the CPU 51 determines whether an icon or image data displayed on the display D has been selected. The CPU 51 also determines whether the display D has been simply pointed to rather than any icon or data being selected.

Figure 3A:
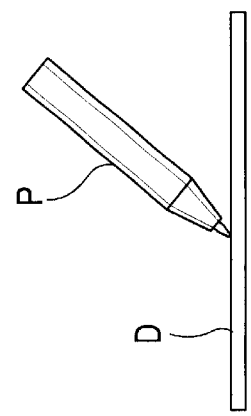
FIGS. 3A–3C illustrate the positional relationship between a pen-type input device and a display of each computer for use in the data transmitting system shown in FIG. 1.
Figure 3B:
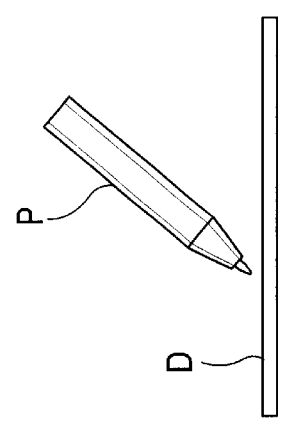
Figure 3C:
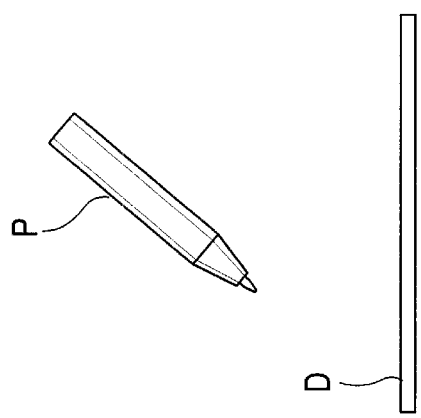

The pen-state identifying unit 56 identifies the distance between the operated pen-type input device P and the display D. More specifically, a determination is made of whether the pen-type input device P is in contact with the display D, as illustrated in FIG. 3A, whether the pen-type Input device P is placed in proximity with the display D without being in contact with each other, as shown in FIG. 3B, or whether the pen-type input device P is sufficiently away from the display D, as illustrated in FIG. 3C. If the pen-state identifying unit 56 has judged that the pen-type input device P is in contact with the display D, and if the pen-type input device P is selecting an icon, the CPU 51 changes the color of the icon and displays it. If the pen-state identifying unit 56 has judged that the pen-type input device P is in proximity with the display D, and if the pen-type input device P is selecting an icon, the CPU 51 shades the icon and displays it. If the pen-state identifying unit 56 has judged that the pen-type input device P is sufficiently away from the display D, the CPU 51 does not cause the pen-type input device P to perform any display operation.

The aforementioned pen states can be identified by using, for example, a pen-type input device that is capable of expressing light and dark shades of handwritten characters or a tablet that is able to detect the input pressure or the distance from a pen-type input device to the display D. As this type of device, an electromagnetic-receiving pen-type input device or tablet (Wacom Co. Ltd.) is known.

Figure 4:
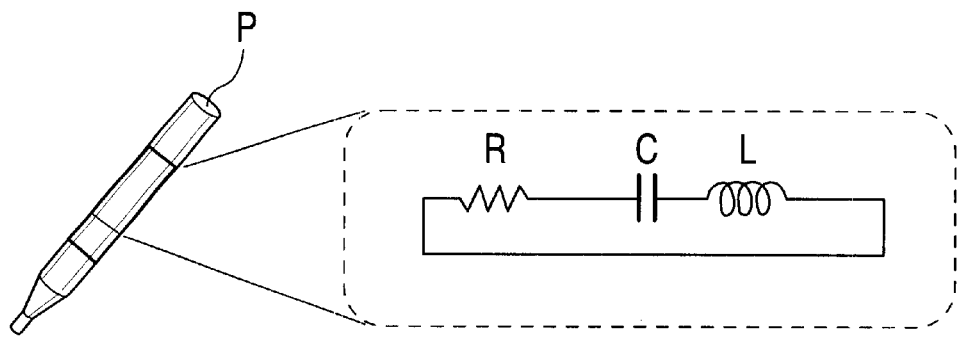
FIG. 4 illustrates an example of setting the ID number of a pen-type input device.
Figure 5:
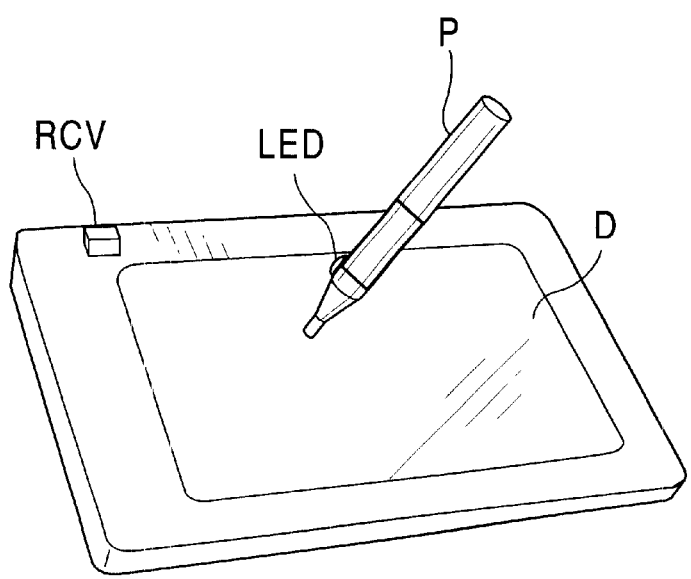
FIG. 5 illustrates an example of setting the ID number of a pen-type input device.

The pen-ID identifying unit 57 identifies the ID number set in an operated pen-type input device P. For example, the ID numbers of the pen-type input devices P are differentiated, as shown in FIG. 4, by varying predetermined values (R, L, C) of a built-in resonator among the above-described electromagnetic-receiving pen-type input devices P. Alternatively, as illustrated in FIG. 5, an infrared diode LED, wireless transmitter, or a wireless tag, which regularly transmits the ID inherent in the pen-type input device P, is loaded with the pen-type input device P, and a receiver RCV is provided for the display D. In this manner, the pen-ID identifying unit 57 identifies the ID numbers of the respective pen-type input devices P (P1–Pn). Thus, when a number of pen-type input devices P (P1–Pn) are used to perform an input operation, for example, if a number of users own the respective pen-type input devices P (P1–Pn) and use them, the CPU 51 determines which pen-type input device P has been operated. The network connecting unit 58 transmits data via the network 10. If data transmission is performed by wireless control, a transmitter and a receiver are provided.

A description is now given of a data transmission method among the computers 20 performed by the data transmitting system 1 constructed as described above. More specifically, it is now assumed that a file F stored in the general-purpose computer 22 is to be transmitted to the compact mobile terminal 24. In the following discussion, the display of the general-purpose computer 22 will be referred to as "the display 22D" and the display of the compact mobile terminal 24 will be referred to as "the display 24D".

Figure 6:
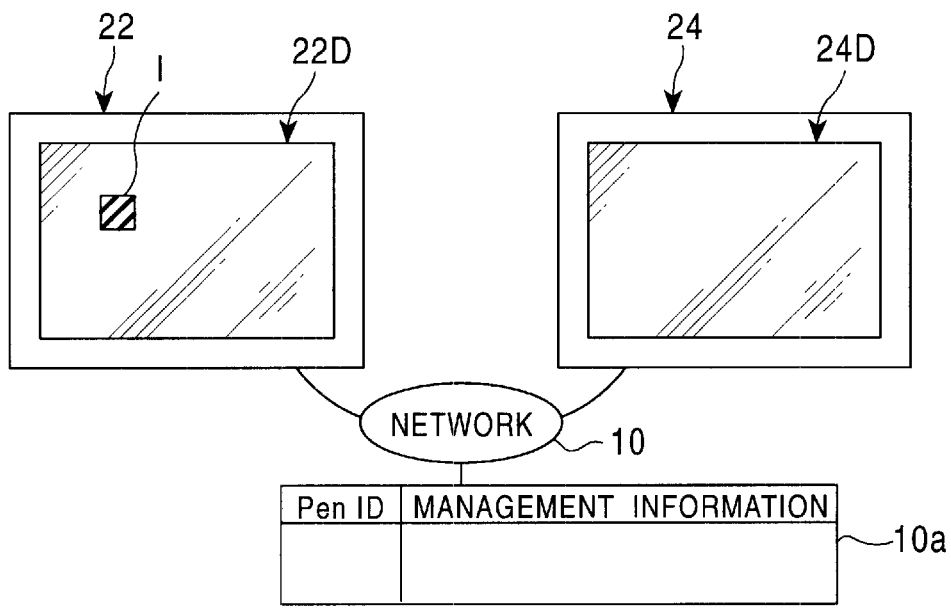
FIG. 6 illustrates a data transmitting method for use in the data transmitting system shown in FIG. 1.

The file F stored in the general-purpose computer 22 is displayed, as illustrated in FIG. 6, on the display 22D in the form of an icon I representing the presence of the file F.

Figure 7:
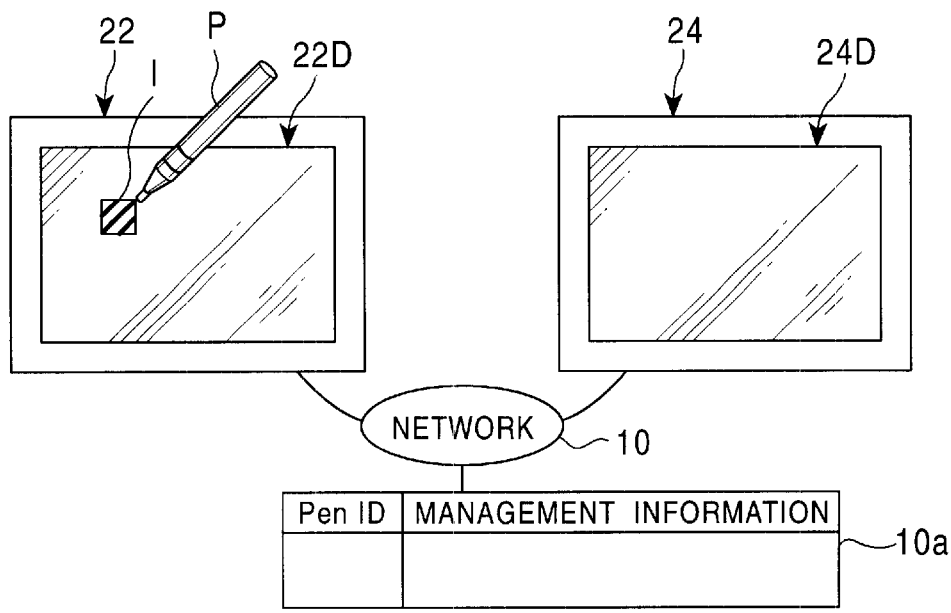
FIG. 7 illustrates a data transmitting method for use in the data transmitting system shown in FIG. 1.
Figure 8:
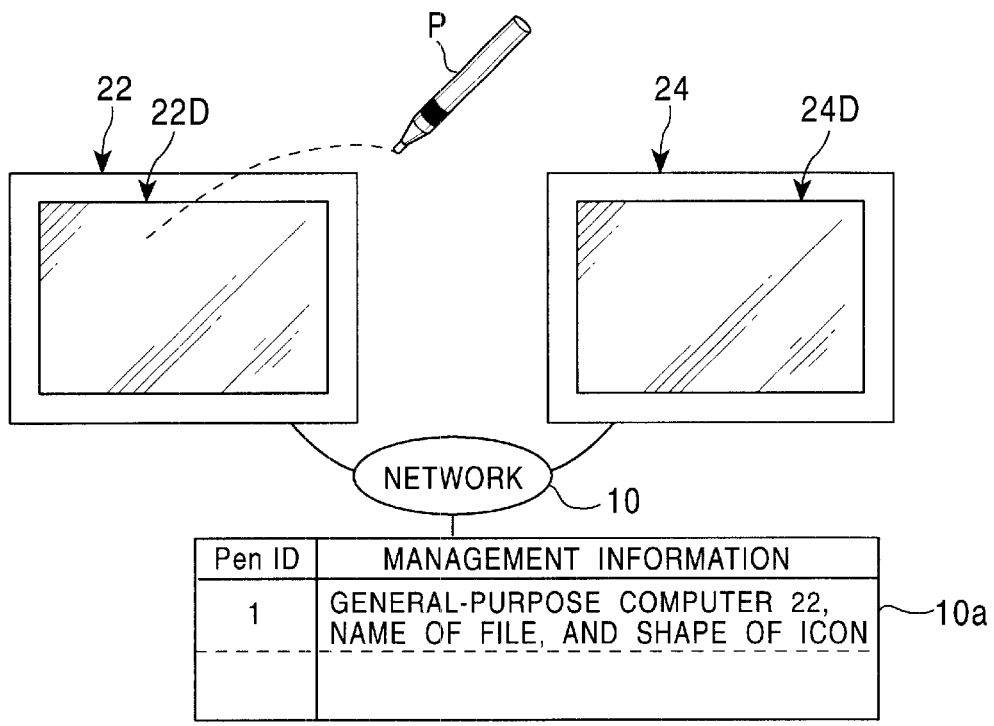
FIG. 8 illustrates a data transmitting method for use in the data transmitting system shown in FIG. 1.

The pen-type input device P is first brought into contact with the icon I on the display 22D and is then raise after a predetermined lapse of time, as shown in FIGS. 7 and 8. Namely, the icon I is picked by the pen-type input device P. At this time, the general-purpose computer 22 identifies the ID number of the operated pen-type input device P. The general-purpose computer 22 then registers, as illustrated in FIG. 8, the management information of the icon I in the management table 10a provided on the network 10 in such a manner that the information corresponds to the ID number. The management information, which is needed for accessing the file F represented by the icon I, includes the ID number, the area where the file F is stored, i.e., the name of the computer, the name of the file F, and the shape of the icon I representing the file F. The information may further include the directory name or the drive name indicating the area where the file F is stored. For example, if the ID number of the pen-type input device is "1", then the name of the general-purpose computer 22, the name of the file F, and the shape of the icon I are registered at the ID number "1" of the management table.

The general-purpose computer 22 then erases, as shown in FIG. 8, the icon from the display 22D. At this time, the icon I representing the file F is displayed on neither the display 22D or the display 24D. Accordingly, it seems to the user that the pen-type input device P virtually retains the file F.

Subsequently, the pen-type input device P is brought into contact with the compact mobile terminal 24. Namely, the pen-type input device P drops the file F on the display 24D of the compact mobile terminal 24. Then, the compact mobile terminal 24 identifies the ID number of the touched pen-type input device P. Further, the compact mobile terminal 24 refers to the management table 10a provided on the network 10 and checks whether the management information corresponding to the identified ID number has been registered. If the compact mobile terminal 24 has determined that the management information corresponding to the ID number of the pen-type input device P has been registered in the management table 10a, the management information, i.e., the name of the computer in which the file F is stored, the name of the file F and the shape of the icon I representing the file F are obtained. Then, the compact mobile terminal 24 requests the computer represented by the management information, i.e., the general-purpose computer 22, to transmit the file F via the network 10. In response to the transmission request, the general-purpose computer 22 transmits the file F to the compact mobile terminal 24.

Figure 9:
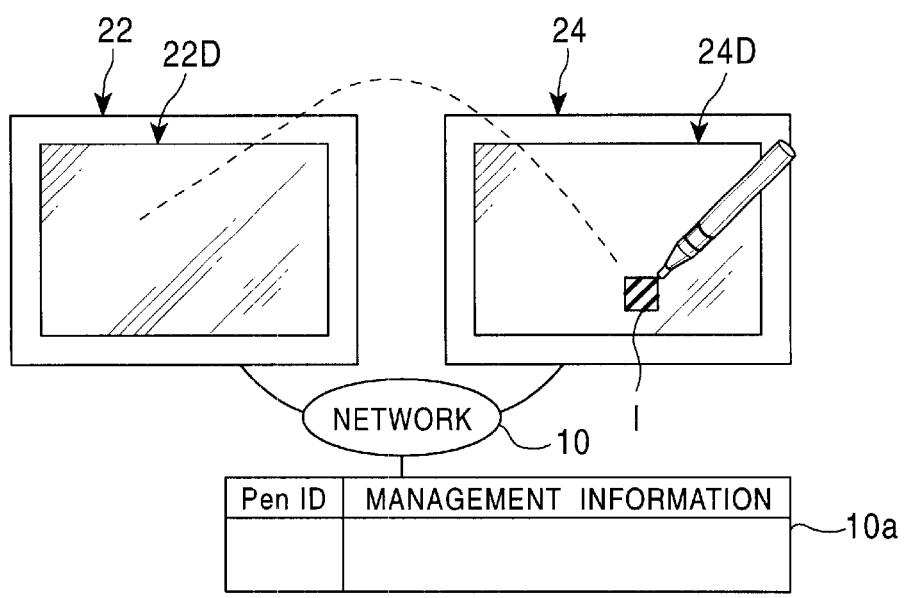
FIG. 9 illustrates a data transmitting method for use in the data transmitting system shown in FIG. 1.

The compact mobile terminal 24 thus receives the file F transmitted from the general-purpose computer 22. The compact mobile terminal 24 then stores the file F in a predetermined storage area and displays the icon I on the display 24D, as illustrated in FIG. 9. Subsequently, the management information in the management table 10a is erased.

According to the aforementioned description, in the data transmitting system 1, the management table 10a is provided on the network 10. It is thus possible to implement natural and simple data transfer from the general-purpose computer 22 to the compact mobile terminal 24 by using the pen-type input device P.

In the data transmitting system 1, the user is able to check the content of the management information corresponding to the ID number during the following period since the general-purpose computer 22 and the compact mobile terminal 24 each have the pen-state identifying unit 56: during the period in which the pen-type input device P is virtually retaining the file F after the icon I displayed on the general-purpose computer 22 has been picked by the pen-type Input device P and before the pen-type input device P touches (drops the file F on) the compact mobile terminal 24; i.e., during the period in which the management information corresponding to the ID number of the pen-type input device P is being registered in the management table 10a. The process for allowing the user to check that the pen-type input device P is virtually retaining the file F is as follows.

Figure 10A:
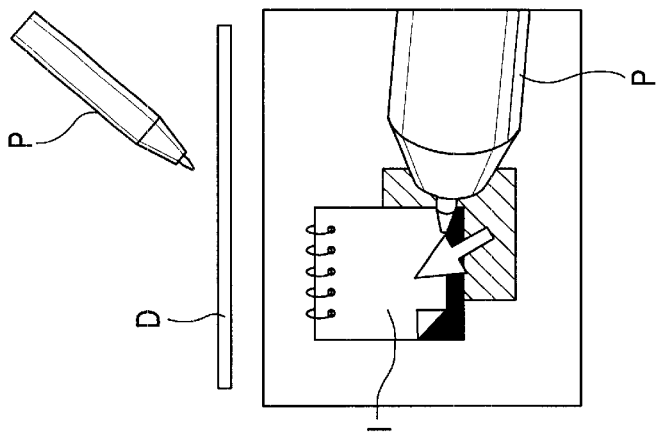
FIGS. 10A–10C illustrate the positional relationship between a pen-type input device and the display content of each computer for use in the data transmitting system shown in FIG.
Figure 10B:
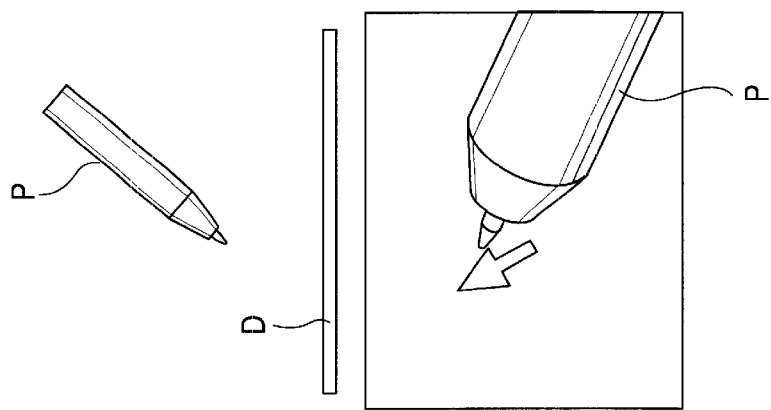
Figure 10C:
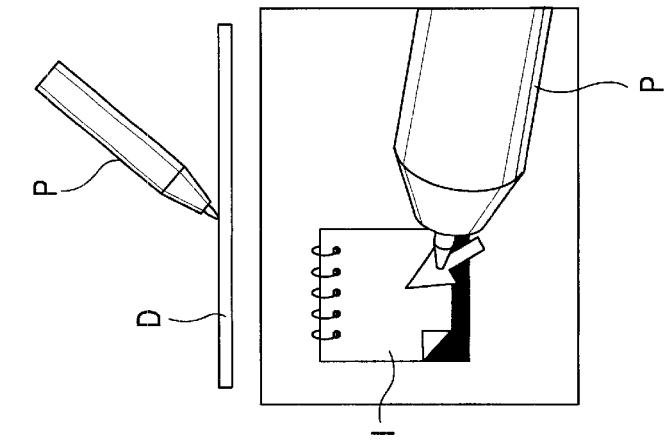

Namely, if the pen-type input device P touches (drops the file F on) the display D of the computer 20, such as the display 24D of the compact mobile terminal 24, as shown in FIG. 10A, from the state in which the pen-type input device P is virtually retaining the file F, the icon I is displayed according to the registered management information. If the pen-type input device P, which is virtually retaining the file F, is sufficiently away from the display D of the computer 20, such as the compact mobile terminal 24, as illustrated in FIG. 10B, the icon I is not displayed on the display D. If the pen-type input device P is brought to be in proximity with the display D of the computer 20, such as the display 24D of the compact mobile terminal 24, without being in contact with each other, as shown in FIG. 10C, from the state in which the pen-type input device P is virtually retaining the file F, the icon I is displayed in a manner different from the normal display state; for example, the icon I with a shadow is displayed. This enables the user to check the file F virtually retained by the pen-type input device P.

As another method for checking the state of the file F virtually retained by the pen-type input device P, a compact liquid crystal display may be provided for the pen-type input device P, and information may be displayed on the liquid crystal display. In this case, a receiver may be provided for the pen-type input device P, and the content to be registered as management information may be displayed via the receiver.

Figure 11:
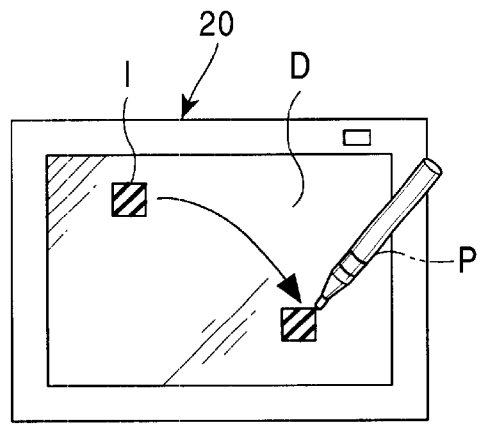
FIG. 11 illustrates a method for transferring data within a display of a single computer for use in the data transmitting system shown in FIG. 1.

In the data transmitting system 1, after the icon I has been picked from the display 22D of the general-purpose computer 22, as shown in FIG. 11, the pen-type input device P may be brought in touch with the display 22D of the general-purpose computer 22 without touching the display D of another computer, i.e., the icon may be moved on the same display 22D. Namely, in the data transmitting system 1, even if the same computer 20 serves as the transmitting side and the receiving side, the operation is performed in a manner similar to the case where different computers 20 serve as the transmitting side and the receiving side. In this case, after the general-purpose computer 22, which the pen-type input device P has picked, has registered the information of the file F in the management table 10a, the general-purpose computer 22, which the pen-type input device P has touched, refers to the management table 10a. It should be noted, however, that the file F is not transmitted via the network 10.

In this manner, according to the data transmitting system 1, even in moving file on the display D of the same computer, the file may be transferred smoothly without needing to continuously bring the pen-type input device P into contact with the display D.

In the data transmitting system 1, management information is registered in he management table 10a on the network 10 in such a manner that it corresponds to the ID number of the pen-type input device P. It is, thus, possible to move file information by a number of pen-type input devices P at the same time. That is, when a number of users are simultaneously using the data transmitting system 1, operations, such as file transmission, may be conducted by using the pen-type input devices P owned by the respective users.

In the data transmitting system 1, in a manner similar to the drag and drop technique with a mouse, an accessory button may be attached to the pen-type input device P, and data transmission may be performed by selecting moving or copying of information depending on whether the button has been pressed.

A discussion has been specifically given in this embodiment that the file F stored in the general-purpose computer 22 is transmitted to the compact mobile terminal 24. However, since the individual computers 20 of the data transmitting system 1 have a similar function for data transmission, data transmission is possible not only between the general-purpose computer 22 and the compact mobile terminal 24, but also among any computers 20 on the network 10.

Figure 12:
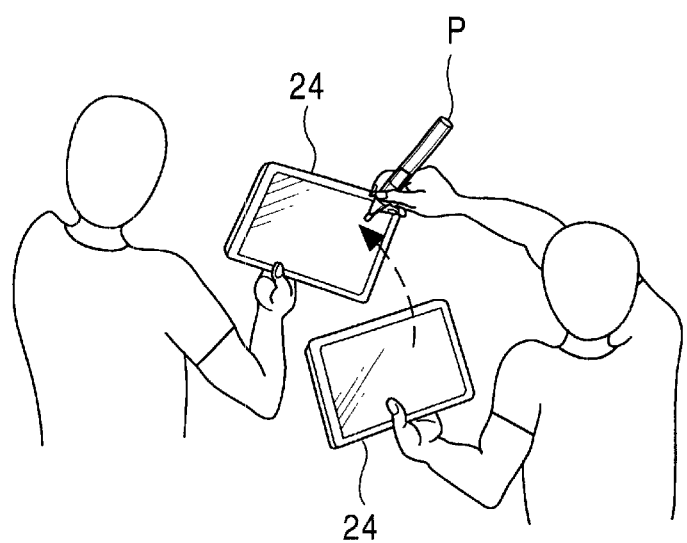
FIG. 12 illustrates data transmission between compact mobile terminals.

Further, in the present invention, the network 10 may be implemented via a telephone line or the Internet, and the size of the network or the distance between the computers 20 are not limitations in implementing the present invention. A network may be formed between the compact mobile terminals 24, a illustrated in FIG. 12, between which data transmission may be conducted.

Figure 13:
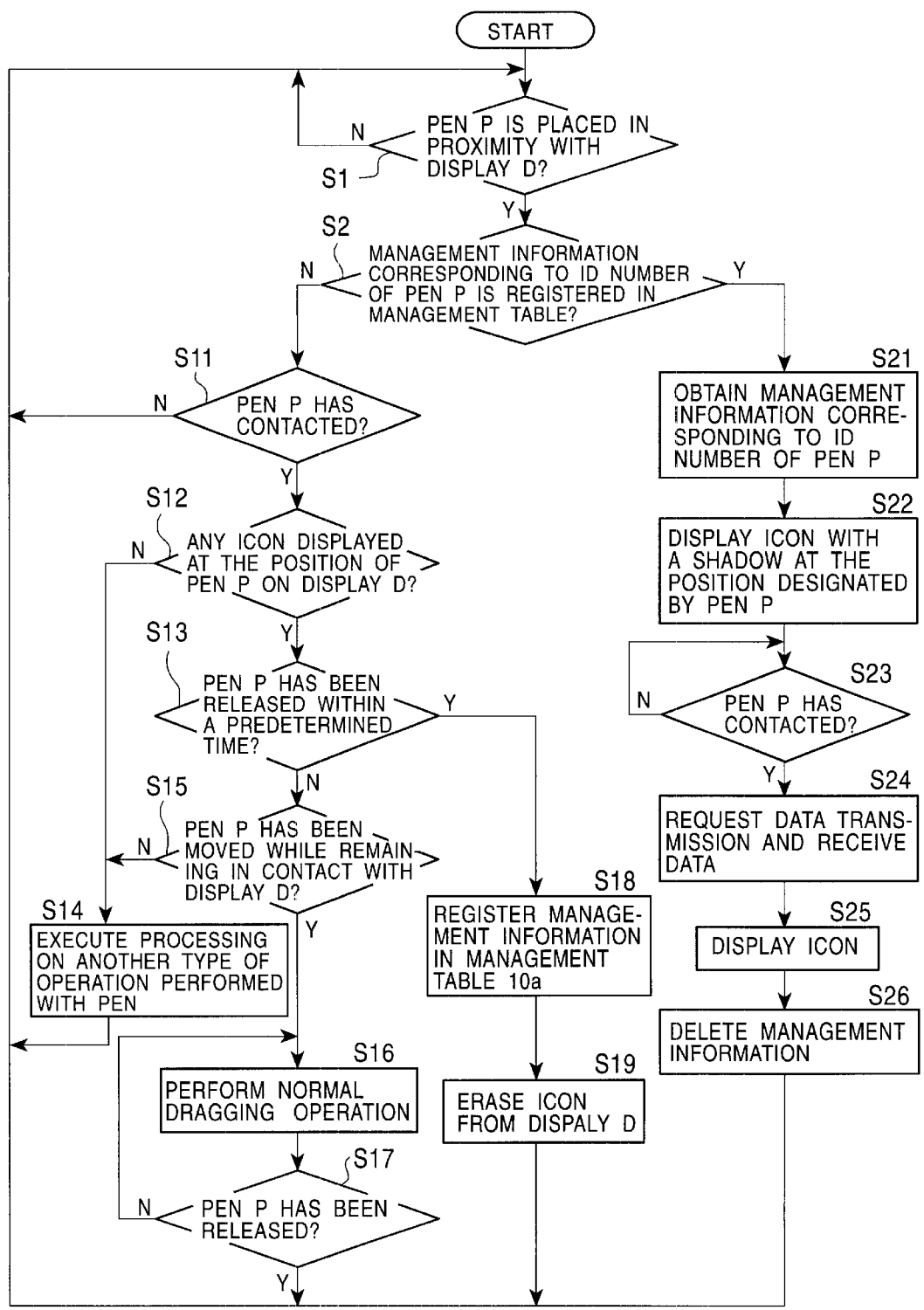
FIG. 13 is a flow chart illustrating the processing executed by each computer for use in the data transmitting system shown in FIG. 1.

Processing executed by the computers 20 is now described below with reference to the flow chart of FIG. 13.

The computer 20 starts processing in step S1 when data is to be transmitted; i.e., when the computer 20 is connected to the network 10 and is ready to transmit data. In step S1, a determination is made of whether the pen-type input device P is placed in proximity with the display D. The process is maintained in the standby position in step S1 until the pen-type input device P is brought into proximity with the display D.

Subsequently, in step S2, the ID number of the pen-type input device P is identified, and a query is made of whether the management information corresponding to the ID number has been registered in the management table 10a. If the answer of step S1 is no, the process proceeds to step S11. On the other hand, if the answer of step S1 is yes, the process proceeds to step S21. Namely, the processing starting from step S11 represents the picking operation performed by the pen-type input device P. The processing starting from step S21 indicates the touching (dropping) operation performed by the pen-type input device P.

The processing starting from step S11 representing the picking operation is as follows.

It is checked in step S11 whether the pen-type input device P has been brought into contact with the display D. If the answer of step S11 is no, i.e., if the pen-type input device P is placed in proximity with the display D without being in contact with each other, the process returns to step S1, and the corresponding processing is repeated. If it is found in step S11 that the pen-type input device P has been brought into contact with the display D, the process proceeds to step S12.

A determination is made in step S12 of whether an icon representing stored data is displayed at the position where the pen-type input device P is in contact with the display D. Namely, it is determined whether the user has selected an icon. If it is found in step S12 that the user has selected an icon, the process proceeds to step S13. Conversely, if it is found in step S12 that the user has not selected an icon, the process proceeds to step S14 in which the processing on another type of operation performed with the pen-type input device P is executed. If a file name is displayed on the display D as text, it is selected in a manner similar to selecting an icon. Namely, the operation similar to copying or moving a file, which would normally be performed by using a mouse, is performed by the pen-type input device P.

A question is then made in step S13 as to whether the pen-type input device P has been released from the display D within a predetermined time after the device P was brought into contact with the display D. If the answer of step S13 is yes, the process proceeds to step S18. If the answer of step 13 is no, the process proceeds to step S15.

A determination is made in step S15 of whether the pen-type input device P has been moved while remaining in contact with the display D. If the answer of step S15 is yes, it is assumed that a file stored in a single computer is to be copied or moved. Then, the processing in steps S16 and S7 is executed. If it is found in step S15 that the pen-type input device P has not been moved, the process proceeds to step S14 in which the processing on another type of operation performed with the pen-type input device P is executed.

In steps S16 and S17, a normal drag and drop operation is performed on the icon. In step S16, the position of the icon on the display D is changed according to the movement of the pen-type input device P. It is then determined in step S17 whether the pen-type input device P has been released from the display D. If the answer of step S17 is no, the loop of the processing in steps S16 and S17 is repeated. If it is found that the pen-type input device P has been released from the display D, the process returns to step S1, and the processing starting from step S1 is repeated.

In step S18, the management information is registered in the management table 10a on the network 10 in such a manner that it corresponds to the ID number of the identified pen-type input device P. The management information includes the ID number, the area where the data selected by the pen-type input device P is stored; i.e., the name of the computer, the name of the data, and the shape of the icon representing the data selected by the pen-type input device P.

Subsequently, in step S19, the icon displayed on the display D is erased, and the processing starting from step S1 is repeated.

The processing starting from step S21 representing the touching (dropping) operation is as follows.

In step S21, based on the ID number of the pen-type input device P that is in proximity with the display D, the management information, such as the area where the data is stored; i.e., the name of the computer, the name of the data, and the shape of the icon, is obtained from the management table 10a.

Subsequently, in step S22, the icon with a shadow is displayed at the position of the display D which is placed in proximity with the pen-type input device P. The icon is displayed according to the information concerning the shape of the icon obtained from the management information.

It is then determined in step S23 whether the pen-type input device P is in contact with the display D, and the process is maintained in the standby position until the pen-type input device P is brought into contact with the display D. If the pen-type input device P is in proximity with the display D without being in contact with each other, the processing starting from step S1 is repeated.

In step S24, transmission of data whose name is indicated by the management information is requested to the computer on the network 10 represented by the management information obtained in step S21. In response to the transmission request, the computer on the network 10 transmits the data. Then, the transmitted data is received and stored in a predetermined storage area in step S24.

Thereafter, in step S25, the icon is displayed at the position of the display D that is in contact with the pen-type input device P.

In step S26, the management information registered in the management table 10a on the network 10 is deleted. In this case, management information only corresponding to the ID number of the operated pen-type input device P is deleted, and the management information corresponding to the other ID numbers is not deleted. This is because management information corresponding to a number of ID numbers is registered in order to implement data transmission by using a number of pen-type input devices P. The management information is erased, and then the processing starting from step S1 is repeated.

Hence, the processing from step S1 to step S26 is executed, thereby enabling each computer 20 to transmit data to another computer 20 connected via the network 10.

According to the aforementioned description, in the data transmitting system 1, data transmission among a number of computers 20 can be performed naturally and simply. Also, data transmitting operations can be simultaneously performed by using a number of pen-type input devices P. As a consequence, a single computer 20 or a number of computers 20 can be handled by a number of users.

In the description of the data transmitting system 1, the display D is an integral type that has a display function implemented by, for example, a liquid crystal, and an input function, such as a tablet or a digitizer. In the present invention, however, an input device, such as a tablet, that is able to perform an input operation cooperatively performed with the display may be provided without using an input/output-integral display.

Figure 14:
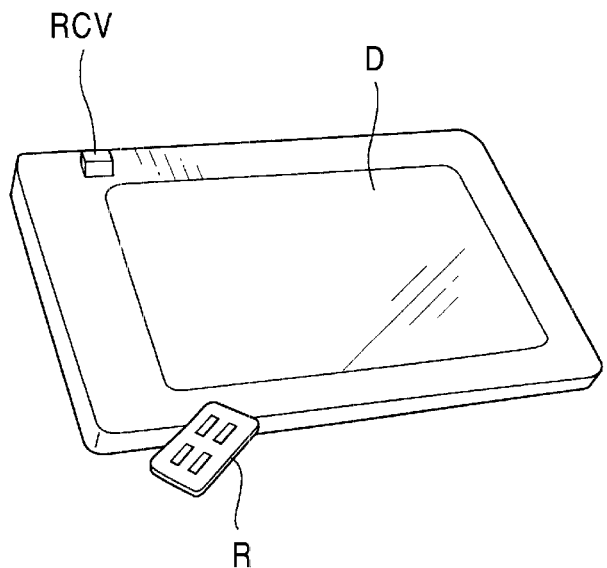
FIG. 14 illustrates an input operation unit for use in the data transmitting system shown in FIG. 1.

In the description of the data transmitting system 1, the pen-type input device P is a pointing device formed in the shape of a pen. In the present invention, however, the input operation unit is not limited to a pen-type device. Instead, a receiver RCV may be provided for the display D, as shown in FIG. 14, and a remotely operated device R, such as an infrared remote controller, may be used to perform an input operation.

To further develop the above-described data transmitting system 1, a data transmitting system according to another embodiment of the present invention is now described with reference to FIG. 15.

Figure 15:
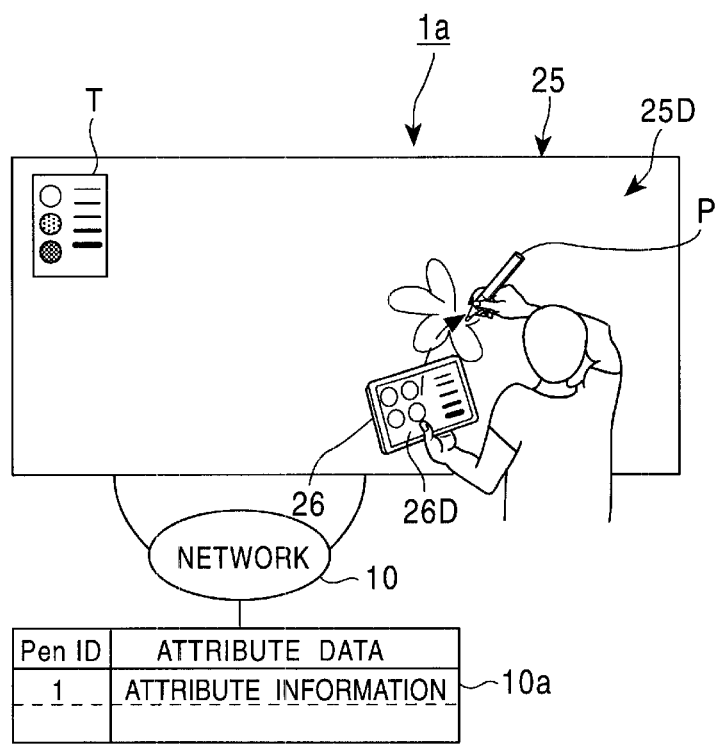
FIG. 15 illustrates a data transmitting system according to another embodiment of the present invention.

In a data transmitting system 1a shown in FIG. 15, a main computer 25 having a wall-mounted display 25D is connected via the network 10 to a compact mobile terminal 26 that has a display 26D and is portable by a single hand of the user. In this transmitting system 1a, as well as in the data transmitting system 1, the management table 10a is provided on the network 10.

The wall-mounted display 25D is a large display used for, for example, presentations or conferences. An input operation is performed on the wall-mounted display 25D by using the pen-type input device P. The user inputs drawings, spreadsheet calculations, or databases on the wall-mounted display 25D by using the pen-type input device P.

A tool palette T for changing the attributes of the pen-type input device P is displayed on the wall-mounted display 25D. Objects, such as the types of lines, graphics, and the colors of lines for inputting drawings, are indicated in the tool palette T. The user picks an object from the tool palette T with the pen-type input device P, changes the attributes of the pen-type input device P, and then inputs a drawing to the wall-mounted display 25D.

The compact mobile terminal 26 is an individual information machine or a diary-type computer, which is referred to as Personal Digital Assistant (PDA). The display 26D of the compact mobile terminal 26 is an input/output-integral type that directly performs an input operation by using the pen-type input device P, as well as displays output data. Objects similar to those on the above-described tool palette T are indicated on the display 26D. The compact mobile terminal 26 stores data corresponding to the objects; i.e., stores attribute data of the pen-type input device P.

The configuration of each of the main computer 25 and the compact mobile terminal 26 is similar to the internal configuration of the computer 20 shown in FIG. 2.

A discussion is now given of a method for transmitting data between the compact mobile terminal 26 and the main computer 25 in the data transmitting system 1a constructed as described above.

The user first brings the pen-type input device P into contact with an object on the display 26D and lifts it within a predetermined time. Namely, the user picks an object with the pen-type input device P. Then, the compact mobile terminal 26 identifies the ID number of the operated pen-type input device P, and the management information corresponding to the ID number and the object is registered in the management table 10a provided on the network 10. The management information represents attribute data of the pen-type input device P, which indicates information according to attributes of the pen-type input device P. As noted above, the attributes of the pen-type input device P include the type of line, graphics, and the color of the line used for inputting a drawing. In this state, the attributes of the pen-type input device P have been changed.

Subsequently, the pen-type input device P is brought into contact with the wall-mounted display 25D of the main computer 25. Namely, the pen-type input device P touches the wall-mounted display 25D. The main computer 25 then identifies the ID number of the operated pen-type input device P. The main computer 25 then refers to the management table 10a provided on the network 10 and checks whether the management information corresponding to the ID number is registered. If it is determined that the management information corresponding to the ID number of the pen-type input device P is registered in the management table 10a on the network 10, the management information, i.e., the attribute data of the pen-type input device P, is obtained. The main computer 25 then requests via the network 10 the computer indicated by this management information, i.e., the compact mobile terminal 26, to transmit the attribute data if necessary.

The main computer 25 changes the attributes of the pen-type input device P based on the attribute data, and displays a drawing in accordance with the operation of the pen-type input device P.

According to the aforementioned description, in the data transmitting system 1a, the management table 10a is provided on the network 10, and attribute data selected by the compact mobile terminal 26 is registered in the management table 10a. Then, the host computer 25 obtains the attribute data of the operated pen-type input device P from the management table 10a and changes the attributes of the pen-type input device P. Thus, a natural and simple operation by the pen-type input device P can be implemented. Further, the attributes of the pen-type input device P are changed by using the compact mobile terminal 26, thereby eliminating a troublesome operation, such as changing the attributes by using the tool palette T.

In the data transmitting system 1a, although a large display, such as the wall-mounted display 25D, is used, the present invention is not restricted to such a display. Any size of display may be used.

In the data transmitting system 1a, the ID number set in the pen-type input device P is identified, and the management information is then registered in correspondence with the ID number. Thus, a number of pen-type input devices P may be used to input data, as shown in FIG. 16.

Figure 16:
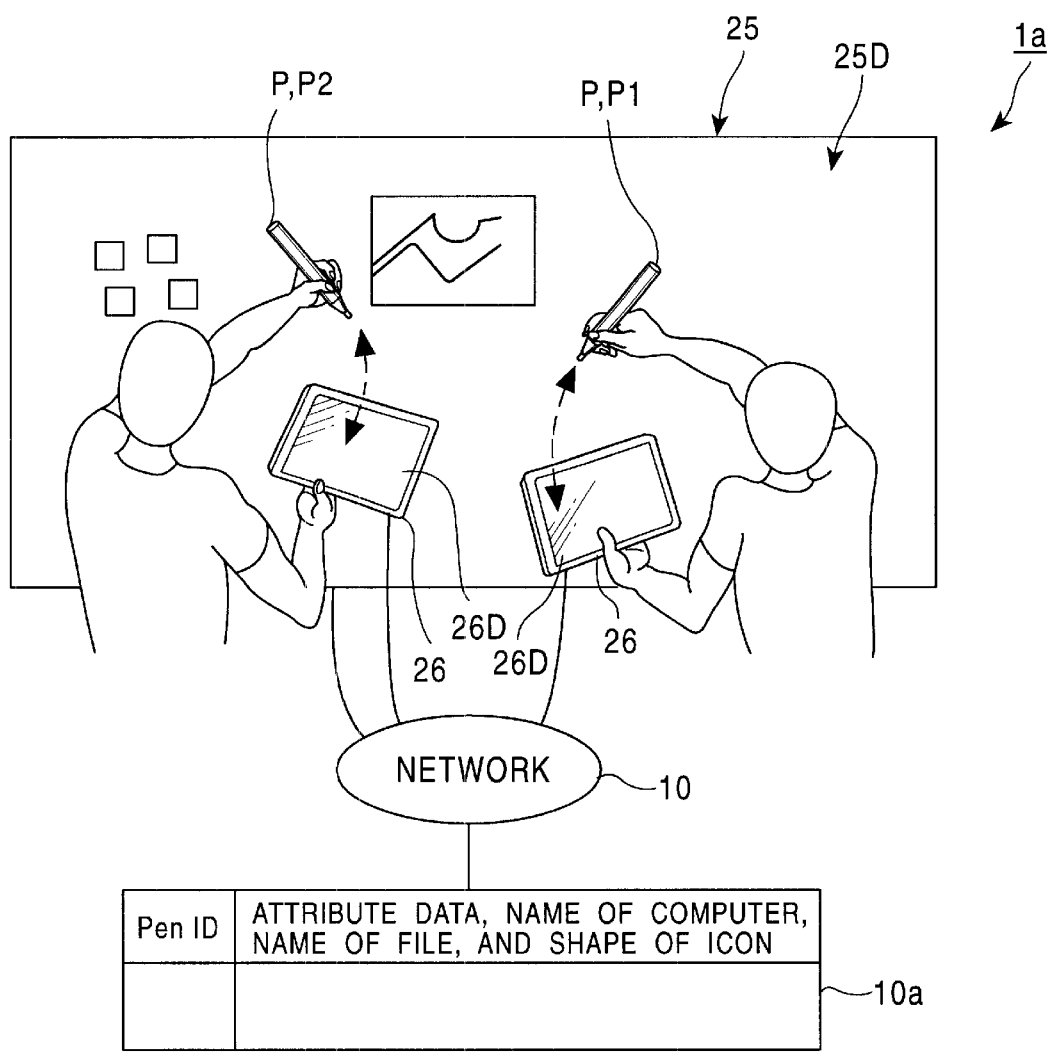
FIG. 16 illustrates a data transmitting system according to still another embodiment of the present invention.

Further, in the data transmitting system 1a, the name of a computer, the name of a file, and the shape of an icon, as well as attribute data, may be registered as the management information in the management table 10a, as illustrated in FIG. 16. Thus, file transfer is made possible in a manner similar to the data transmitting system 1 of the previous embodiment, and the attributes of the pen-type input device P can be changed.

Additionally, in the data transmitting system 1a, information, such as the name of a computer, is registered as the management information, and a number of compact mobile terminals 26 may be connected to the network 10. This enables a number of users to utilize a single wall-mounted display 25D.

As is seen from the foregoing description, the present invention offers the following advantages. Data can be naturally and simply transferred among a number of computers or information concerning the presence of data is naturally and simply transferred on a single display. Moreover, data can be transmitted simultaneously among a number of computers or information concerning the presence of data is simultaneously transferred on a single display by using a number of input operation units. Accordingly, a single computer or a number of computers can be handled by a number of users.

Although the present invention has been described with reference to specific embodiments, those of skill in the art will recognize that changes may be made thereto without departing from the spirit and scope of the invention as set forth in the hereafter appended claims.

What is claimed is:

1. A data transferring apparatus comprising:
   a data storage unit for storing data;
   a display/input unit for displaying information concerning a presence of the data stored in the data storage unit, the display/input unit being operated by at least one input operation unit, each input operation unit having an ID number;
   a network connector for transmitting data via a network that is provided with a management table in which management information representing the information concerning the presence of the data is registered; and
   a controller for identifying, upon selecting by the input operation unit the information concerning the presence of the data displayed on the display/input unit, the ID number of the operated input operation unit and for registering in the management table, the management information representing the information concerning the presence of the selected data in correspondence with the identified ID number, and for transferring, upon obtaining a data transmission request that has been provided by the input operation unit from a device on the network, data corresponding to the information indicating the presence of the data represented by the registered management information from the data storage unit to the device on the network.

2. A data transferring apparatus as claimed in claim 1, wherein the data storage unit stores data in units of files, the display/input unit displays information concerning a file stored in the data storage unit as the information concerning the presence of the data, and the network connector transfers the file via the network provided with the management table in which a name of the file and a storage area of the file are registered as the management information.

3. A data transferring apparatus as claimed in claim 2, wherein the display/input unit displays an icon of the file as the information concerning the presence of the data stored in the data storage; unit, and the network connector transfers the file via the network provided with the management table in which the name of the file, the storage area of the file, and icon information are registered as the management information.

4. A data transferring apparatus as claimed in claim 1, wherein the data storage unit stores attribute data of the input operation unit, the display/input unit displays attribute information concerning the attribute data stored in the data storage unit as the information concerning the presence of the data, and the network connector transfers the attribute data via the network provided with the management table in which the attribute information is registered as the management information.

5. A data transferring apparatus as claimed in claim 1, wherein the data storage unit stores the data in units of files and attribute data of the input operation unit, the display/ input means displays information concerning a file stored in the data storage unit as the information concerning the presence of the data and displays attribute information concerning the attribute data stored in the data storage unit, and the network connector transfers at least one of the file and the attribute data via the network provided with the management table in which a name of the file, a storage area of the file, and the attribute information are registered as the management information.

6. A data transferring apparatus as claimed in claim 1, wherein in a case where the management information representing the information concerning the presence of the selected data is registered in the management table in correspondence with the identified ID number, the controller provides an indication that the information concerning the presence of the data has been selected by the input operation unit corresponding to the identified ID number.

7. A data transferring apparatus as claimed in claim 3; wherein in a case where the name of the file, the storage area of the file, and the icon information representing the selected icon are registered in the management table in correspondence with the identified ID number, the controller displays a selection-indicating icon indicating that the icon has been selected by the input operation unit corresponding to the identified ID number when the input operation unit is placed in proximity with the display/input unit.

8. A data transferring apparatus as claimed in claim 1, wherein the input operation unit includes a pen-type input device.

9. A data transferring apparatus as claimed in claim 1, wherein the input operation unit includes an input device that performs an input operation on the display/input unit by remote control.

10. A data receiving apparatus comprising:
   a data storage unit for storing data;
   a display/input unit for displaying information concerning a presence of the data stored in the data storage unit, the display/input unit being operated by at least one input operation unit, each input operation unit having an ID number;
   a network connector for transmitting data via a network that is provided with a management table in which management information representing the information concerning the presence of the data is registered; and
   a controller for identifying, upon performing an input operation on the display/input unit by the input operation unit, the ID number of the operated input operation unit, and for requesting the device on the network indicated by the management information registered in the management table in correspondence with the ID number, to transmit the data corresponding to the management information, and for receiving the data from the device on the network and storing it in the data storage unit.

11. A data receiving apparatus as claimed in claim 10, wherein the data storage unit stores the data in units of files, the display/input unit displays information concerning a file stored in the data storage unit as the information concerning the presence of the data, and the network connector receives the file via the network provided with the management table in which a name of the file and a storage area of the file are registered as the management information.

12. A data receiving apparatus as claimed in claim 11, wherein the display/input unit displays an icon of the file stored in the data storage unit as the information concerning the presence of the data, and wherein the network connector receives the file via the network provided with the management table in which the name of the file, the storage area of the file, and icon information are registered as the management information.

13. A data receiving apparatus as claimed in claim 10, wherein the display/input unit displays input information of the input operation unit in accordance with attributes of the input operation unit, the network connector receives attribute data via the network provided with the management table in which attribute information of the input operation unit is registered as the management information, and the controller receives the attribute data from the device on the network and controls the attributes of the input operation unit based on the received attribute data.

14. A data receiving apparatus as claimed in claim 10, wherein the data storage unit stores the data in units of files, the display/input unit displays information concerning a file stored in the data storage unit as the information concerning the presence of the data and displays input information of the input operation unit in accordance with attributes of the input operation unit, the network connector receives the file or attribute data via the network provided with the management table in which a name of the file, a storage area of the file, and attribute information are registered as the management information, and the controller at least one of receives the file from the device on the network and stores it in the data storage unit, and receives the attribute data from the device on the network and controls the attributes of the input operation unit based on the received attribute data.

15. A data receiving apparatus as claimed in claim 10, wherein in a case where the management information representing the information concerning the presence of the selected data is registered in the management table in correspondence with the identified ID number, the controller provides an indication that the information concerning the presence of the data has been selected by the input operation unit corresponding to the identified ID number.

16. A data receiving apparatus as claimed in claim 12, wherein in a case where the name of the file and the storage area of the file, and the icon information, which are indicated by the selected icon, are registered in the management table in correspondence with the identified ID number, the controller displays a selection-indicating icon indicating that the icon has been selected by the input operation unit corresponding to the identified ID number when the input operation unit is placed in proximity with the display/input unit.

17. A data receiving apparatus as claimed in claim 10, wherein the input operation unit includes a pen-type input device.

18. A data receiving apparatus as claimed in claim 10, wherein the input operation unit includes an input device that performs an input operation on the display/input unit by remote control.

19. A data transferring and receiving apparatus comprising:
   a data storage unit for storing data;
   a display/input unit for displaying information concerning a presence of the data stored in the data storage unit, the display/input unit being operated by at least one input operation unit, each input operation unit having an ID number;
   a network connector for transmitting data via a network that is provided with a management table in which management information representing the information concerning the presence of the data is registered; and
   a controller for identifying, upon selecting the information concerning the presence of the data indicated on the display/input unit by the input operation unit, the ID number of the operated input operation unit, for checking for management information registered in the management table in correspondence with the identified ID number, and in a case where there is no management information registered in the checked management table and the information concerning the presence of the data displayed on the display/input unit is selected by the input operation unit, for registering the management information representing the information concerning the presence of the selected data in the management table in correspondence with the identified ID number, for transferring from the data storage unit to the device on the network, upon obtaining a data transmission request that has been provided by the input operation unit from the device on the network, data corresponding to the information concerning the presence of the data represented by the registered management information, and for requesting, in a case where management information representing the information concerning the presence of the data is registered in the checked management table, the device on the network indicated by the management information in correspondence with the ID number to transmit data corresponding to the management information and for receiving the data from the device on the network and storing it in the data storage unit.

20. A data transferring and receiving apparatus as claimed in claim 19, wherein the data storage unit stores the data in units of files, the display/input unit displays information concerning a file stored in the data storage unit as the information concerning the presence of the data, and the network connector transmits the file via the network provided with the management table in which a name of a file and a storage area of the file are registered as the management information.

21. A data transferring and receiving apparatus as claimed in claim 20, wherein the display/input unit displays an icon of the file stored in the data storage unit as the information concerning the presence of the data, and wherein the network connector transfers the file via the network provided with the management table in which the name of the file, the storage area of the file, and icon information are registered as the management information.

22. A data transferring and receiving apparatus as claimed in claim 19, wherein the data storage unit stores the data in units of files and attribute data of the input operation unit, the display/input unit displays information concerning a file stored in the data storage unit as the information concerning the presence of the data and displays attribute information concerning the attribute data stored in the data storage unit, and the network connector transfers at least one of the file and the attribute data via the network provided with the management table in which a name of the file, a storage area of the file, and the attribute information are registered as the management information.

23. A data transferring and receiving apparatus as claimed in claim 19, wherein the data storage unit stores the data in units of files, the display/input unit displays information concerning a file stored in the data storage unit as the information concerning the presence of the data and also displays input information of the input operation unit in accordance with attributes of the input operation unit, the network connector transmits the file and attribute data via the network provided with the management table in which a name of a file and a storage area of the file, and attribute information of the input operation unit are registered as the management information, and the controller at least one receives of the file from the device on the network and stores it in the data storage unit, and receives the attribute data from the device on the network and controls the attributes of the input operation unit based on the received attribute data.

24. A data transferring and receiving apparatus as claimed in claim 19, wherein in a case where management information representing the information concerning the presence of the selected data is registered in the management table in correspondence with the identified ID number, the controller provides an indication that the information concerning the presence of the data has been selected by the input operation unit corresponding to the identified ID number.

25. A data transferring and receiving apparatus as claimed in claim 21, wherein in a case where the name of the file and the storage area of the file, and the icon information, which are indicated by the selected icon, are registered in the management table in correspondence with the identified ID number, the controller displays a selection-indicating icon indicating that the icon has been selected by the input operation unit corresponding to the identified ID number when the input operation unit is placed in proximity with the display/input unit.

26. A data transferring and receiving apparatus as claimed in claim 19, wherein the input operation unit includes a pen-type input device.

27. A data transferring and receiving apparatus as claimed in claim 19, wherein the input operation unit includes an input device that performs an input operation on the display/input unit by remote control.

28. A data transmitting system, comprising:
   a network provided with a management table in which management information representing information concerning the presence of data is registered;
   a plurality of data transferring and receiving apparatuses connected on the network, each of the data transferring and receiving apparatuses comprising:
   a data storage unit for storing data;
   a display/input unit for displaying information concerning the presence of the data stored in the data storage unit, the display/input unit being operated by at least one input operation unit, each input operation unit having an ID number;
   a network connector for transmitting data via the network; and
   a controller for identifying, upon selecting the information concerning the presence of the data indicated on the display/input unit by the input operation unit, the ID number of the operated input operation unit, for checking for management information registered in the management table in correspondence with the identified ID number, and in a case where there is no management information registered in the checked management table and the information concerning the presence of the data displayed on the display/input unit is selected by the input operation unit, for registering the management information representing the information concerning the presence of the selected data in the management table in correspondence with the identified ID number, for transferring from the data storage unit to the device on the network, upon obtaining a data transmission request that has been provided by the input operation unit from the device on the network, data corresponding to the information concerning the presence of the data represented by the registered management information, and for requesting, in a case where management information representing the information concerning the presence of the data is registered in the checked management table, the device on the network indicated by the management information in correspondence with the ID number to transmit data corresponding to the management information and for receiving the data from the device on the network and storing it in the data storage unit.

29. A data transmitting system as claimed in claim 28, wherein one of the plurality of data transferring and receiving apparatuses connected on the network manages the management table provided on the network.

30. A data transmitting system as claimed in claim 28, wherein the input operation unit that performs an input operation on the display/input unit of each of the data transferring and receiving apparatuses includes a pen-type input device.

31. A data transmitting system as claimed in claim 28, wherein the input operation unit that performs an input operation on the display/input unit of each of the data transferring and receiving apparatuses includes an input device that performs an input operation on the display/input unit by remote control.

32. A data transferring method, comprising the steps of:
registering, upon selecting information concerning a presence of displayed data operated by at least one input operation unit, with each input operation unit having an ID number, management information representing the information concerning the presence of the selected data in a management table provided on a network; and
transferring, upon obtaining a data transmission request that has been provided by the input operation unit from a device on the network, data corresponding to the information concerning the presence of the data represented by the registered management information to the device on the network; wherein in a case where the information concerning the presence of the displayed data is selected by the input operation unit, the ID number of the operated input operation unit is identified, and the management information representing the information concerning the presence of the selected data is registered in the management table in correspondence with the identified ID number.

33. A data transferring method as claimed in claim 32, wherein the data is stored in units of files, and information concerning a file stored as the information concerning the presence of the data is displayed, and a name of the file and a storage area of the file are registered as the management information in the management table provided on the network, and the file is transmitted to the device on the network.

34. A data transferring method as claimed in claim 33, wherein an icon of the file stored as the information concerning the presence of the data is displayed, and the name of the file, the storage area of the file, and icon information are registered as the management information in the management table provided on the network.

35. A data transferring method as claimed in claim 32, wherein attribute data of the input operation unit is stored as data, and attribute information of the attribute data stored as the information concerning the presence of the data is displayed and registered as the management information in the management table provided on the network, and the attribute data is transferred to the device on the network.

36. A data transferring method as claimed in claim 32, wherein attribute data of the data in units of files and attribute data of the input operation unit are stored, and information concerning a file stored as the information concerning the presence of the data and attribute information of the attribute data are displayed, and a name of the file, a storage area of the file, and the attribute information are registered as the management information in the management table provided on the network, and one of the file and the attribute data is transferred to the device on the network.

37. A data transferring method as claimed in claim 32, wherein in a case where the management information representing the information concerning the presence of the selected data is registered in the management table in correspondence with the identified ID number, an indication is provided that the information concerning the presence of the data has been selected by the input operation unit corresponding to the ID number.

38. A data transferring method as claimed in claim 34, wherein in a case where the name of the file, the storage area of the file, and the icon information, which are indicated by the selected icon, are registered in the management table corresponding to the identified ID number, a selection-indicating icon indicating that the icon has been selected by the input operation unit corresponding to the identified ID number is displayed when the input operation unit is placed in proximity with an input unit.

39. A data transferring method as claimed in claim 32, herein the input operation unit includes a pen-type input device.

40. A data transferring method as claimed in claim 32, wherein the input operation unit includes an input device that performs an input operation on the input unit by remote control.

41. A data receiving method comprising the steps of:
identifying, upon performing an input operation by at least one input operation unit, with each input operation unit having an ID number, the ID number of the operated input operation unit, and checking the management information registered in the management table in correspondence with the identified ID number;
requesting a device on the network indicated by the management information to transmit data corresponding to the management information; and
receiving the data from the device on the network and storing it.

42. A data receiving method as claimed in claim 41, wherein a name of a file and a storage area of the file registered in the management table provided on the network are checked as the management information, and a request is provided to the device on the network indicated by the management information to transmit the file corresponding to the management information, and the file is received from the device on the network and is stored.

43. A data receiving method as claimed in claim 42, wherein the name of the file, the storage area of the file, and icon information, which are registered in the management table provided on the network, are checked as the management information.

44. A data receiving method as claimed in claim 41, wherein attribute data of the input operation unit registered in the management table provided on the network is checked as the management information, and a request is provided to the device on the network indicated by the management information to transmit the attribute data corresponding to the management information, and the attribute data is received from the device on the network, and input information of the input operation unit is displayed according to the attribute data.

45. A data receiving method as claimed in claim 41, wherein a name of a file, a storage area of the file, and attribute data of the input operation unit, which are registered in the management table provided on the network, are checked as the management information, and a request is provided to the device on the network indicated by the management information to transmit the file corresponding to the management information, and the file is received from the device on the network and stored, and the attribute data is received from the device on the network and input information of the input operation unit is displayed according to the attribute data.

46. A data receiving method as claimed in claim 41, wherein in a case where the management information representing the information concerning the presence of the selected data is registered in the management table in correspondence with the identified ID number, an indication is provided that the information concerning the presence of the data has been selected by the input operation unit corresponding to the ID number.

47. A data receiving method as claimed in claim 43, wherein in a case where the name of the file, the storage area of the file, and the icon information, which are indicated by the selected icon, are registered in the management table in correspondence with the identified ID number, a selection-indicating icon indicating that the icon has been selected by the input operation unit corresponding to the ID number is displayed when the input operation unit is placed in proximity with an input unit.

48. A data receiving method as claimed in claim 41, wherein the input operation unit includes a pen-type input device.

49. A data receiving method as claimed in claim 41, wherein the input operation unit includes an input device that performs an input operation on an input unit by remote control.

50. A data transferring and receiving method comprising the steps of:
 identifying, upon selecting information concerning the presence of the displayed data by at least one input operation unit, with each input operation unit having an ID number, the ID number of the operated input operation unit, and checking the management information registered in the management table in correspondence with the identified ID number;
 registering in the management table in correspondence with the identified ID number, in a case where there is no management information registered in the checked management table and where the information concerning the presence of the displayed data is selected by the input operation unit, the management information representing the information concerning the presence of the selected data, and transferring, upon obtaining a data transmission request that has been provided by the input operation unit from a device on the network, data corresponding to the information concerning the presence of the data indicated by the registered management information to the device on the network; and
 requesting, in a case where the management information representing the information concerning the presence of the data is registered in the checked management table, the device on the network indicated by the management information to transmit data corresponding to the management information, and receiving the data from the device on the network and storing it.

51. A data transmitting method, comprising the steps of:
 registering, upon selecting information concerning a presence of data displayed on a transmitting side by at least one input operation unit, with each input operation unit having an ID number, management information representing the information concerning the presence of the selected data in a management table provided on a network;
 checking, upon performing an input operation on a receiving side by the input operation unit, the management information and requesting the transmitting side to transmit data corresponding to the management information;
 transferring to the receiving side from the transmitting side, upon obtaining the data transmission request, the data corresponding to the information concerning the presence of the data indicated by the registered management information; and
 receiving the data by the receiving side and storing it;
 wherein the transmitting side identifies the ID number of the operated input operation unit and registers the management information representing the information concerning the presence of the selected data in the management table in correspondence with the identified ID number, and upon performing an input operation on the receiving side by the input operation unit, the receiving side identifies the ID number of the operated input operation unit, and checks the management information registered in the management table in correspondence with the identified ID number, and provides a request to the transmitting side to transmit data corresponding to the management information.

52. A data transferring program storage medium storing a program that executes processing, comprising the steps of:
 registering, upon selecting information concerning a presence of displayed data operated by at least one input operation unit, with each input operation unit having an ID number, management information representing the information concerning the presence of the selected data in a management table provided on a network;
 transferring, upon obtaining a data transmission request that has been provided by the input operation unit from a device on the network, data corresponding to the information concerning the presence of the data indicated by the registered management information to the device on the network; and
 wherein in a case where the information concerning the presence of the displayed data is selected by the input operation unit, the ID number of the operated input operation unit is identified, and the management information representing the information concerning the presence of the selected data is registered in the management table in correspondence with the identified ID number.

53. A data receiving program storage medium storing a program that executes processing, comprising the steps of:
 identifying, upon performing an input operation by at least one input operation unit, with each input operation unit having an ID number, the ID number of the operated input operation unit;
 requesting a device on a network indicated by management information representing information concerning the presence of data registered in a management table provided on a network to transmit data corresponding to the management information; and
 receiving the data from the device on the network and storing it.

54. A data transferring and receiving program storage medium storing a program that executes processing comprising the steps of:

identifying, upon selecting the information concerning the presence of the displayed data by at least one input operation unit, with each input operation unit having an ID number, the ID number of the operated input operation unit, and checking the management information registered in the management table in correspondence with the identified ID number;

registering in the management table in correspondence with the identified ID number, in a case where there is no management information in the checked management table and where the information concerning the presence of the displayed data is selected by the input operation unit, the management information representing the information concerning the presence of the selected data in the management table, and transferring, upon obtaining a data transmission request that has been provided by the input operation unit from a device on the network, data corresponding to the information concerning the presence of the data indicated by the registered management information to the device on the network; and requesting, in a case where the management information representing the information concerning the presence of the data is registered in the checked management table, the device on the network indicated by the management information to transmit data corresponding to the management information, and receiving the data from the device on the network and storing it.

* * * * *